(12) United States Patent
Mancuso

(10) Patent No.: US 11,580,601 B1
(45) Date of Patent: *Feb. 14, 2023

(54) SECURE MULTI-SERVER INTEREST RATE BASED INSTRUMENT TRADING SYSTEM AND METHODS OF INCREASING EFFICIENCY THEREOF

(71) Applicant: NEXT LEVEL DERIVATIVES LLC, Garden City, NY (US)

(72) Inventor: Charles Mancuso, Monroe, NY (US)

(73) Assignee: Next Level Derivatives LLC, Garden City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,383

(22) Filed: Feb. 13, 2020

Related U.S. Application Data

(63) Continuation of application No. 14/830,555, filed on Aug. 19, 2015, now Pat. No. 10,565,647.
(Continued)

(51) Int. Cl.
*G06Q 40/00* (2012.01)
*G06Q 40/06* (2012.01)
*G06Q 40/04* (2012.01)

(52) U.S. Cl.
CPC .................................. *G06Q 40/04* (2013.01)

(58) Field of Classification Search
CPC ...... G06Q 40/04; G06Q 40/025; G06Q 40/00; G06Q 40/06; G06Q 30/08; G06Q 50/06;
(Continued)

(56) References Cited

U.S. PATENT DOCUMENTS 7,698,192 B2   4/2010   Kiron et al.
7,979,343 B2 * 7/2011   Dick ...................... G06Q 40/04
                                                   705/37
(Continued)

OTHER PUBLICATIONS

STIC EIC Search Report, dated Jun. 1, 2021. (Year: 2021).*
(Continued)

*Primary Examiner* — Hai Tran
(74) *Attorney, Agent, or Firm* — Cooley LLP

(57) ABSTRACT

The SECURE MULTI-SERVER INTEREST RATE BASED INSTRUMENT TRADING SYSTEM AND METHODS OF INCREASING EFFICIENCY THEREOF AND ASSOCIATED INTEREST RATE BASED FINANCIAL INSTRUMENT ("IRFI") provides efficient, secure instrument transactions. The IRFI provides increased trading system security and efficiency for an interest-rate based instrument exchange utilizing a server-based trading platform. The IRFI receives a user selection of a contract including associated characteristic parameters. The IRFI receives user-selected number of contracts to trade associated with a basis point for the contract. An artificial neural network, including at least one input layer, a hidden layer and an output layer, can determine a risk hedging amount based on the basis point for the contract and the selected number of contracts to cover a risk in an auction. The IRFI receives pricing data associated with an auction system, the pricing data including settlement yield and delivery price and determines a delivery amount for the contract.

15 Claims, 7 Drawing Sheets

Related U.S. Application Data

(60) Provisional application No. 62/039,393, filed on Aug. 19, 2014.

(58) Field of Classification Search
CPC .... G06Q 30/02; G06Q 30/06; G06Q 30/0601; G06Q 50/188; G06Q 10/043; G06Q 20/203; G06Q 30/0224; G06Q 40/02; G06Q 10/04; G06Q 10/087; G06Q 20/102; G06Q 30/00; G06Q 30/0201; G06Q 30/0202; G06Q 30/0206; G06Q 30/0207; G06Q 30/0244; G06Q 30/0283; G06Q 30/04; G06Q 30/0619; G06Q 30/0635; G06Q 50/18; G06Q 99/00
USPC .................................................... 705/35–45
See application file for complete search history.

(56) References Cited

U.S. PATENT DOCUMENTS

| | | | |
|---|---|---|---|
| 8,438,093 B1 | 5/2013 | Palmer | |
| 8,527,393 B2 | 9/2013 | Boudreault et al. | |
| 8,694,455 B2* | 4/2014 | Eder | G06Q 10/06375 706/45 |
| 8,874,477 B2* | 10/2014 | Hoffberg | G06Q 10/103 705/37 |
| 9,607,337 B2* | 3/2017 | Amicangioli | G06Q 10/0635 |
| 9,747,465 B2 | 8/2017 | Glenville et al. | |
| 9,747,641 B2 | 8/2017 | Wilson, Jr. et al. | |
| 9,767,310 B2 | 9/2017 | Glenville et al. | |
| 9,911,157 B2 | 3/2018 | Johnston et al. | |
| 9,965,804 B1 | 5/2018 | Winklevoss et al. | |
| 9,984,535 B2 | 5/2018 | Odom | |
| 10,002,388 B2 | 6/2018 | Farnstrom | |
| 10,007,950 B2 | 6/2018 | Bridy et al. | |
| 10,891,535 B1 | 1/2021 | Mancuso | |
| 2002/0052795 A1 | 5/2002 | Dines et al. | |
| 2004/0225536 A1 | 11/2004 | Schoen et al. | |
| 2005/0015323 A1* | 1/2005 | Myr | G06Q 40/06 705/37 |
| 2006/0277014 A1 | 12/2006 | Loder et al. | |
| 2007/0162367 A1 | 7/2007 | Smith et al. | |
| 2007/0219893 A1 | 9/2007 | Xu | |
| 2009/0177591 A1* | 7/2009 | Thorpe | G06Q 40/06 705/37 |
| 2010/0268632 A1* | 10/2010 | Rosenthal | G06Q 40/04 705/37 |
| 2012/0011054 A1* | 1/2012 | Grody | G06Q 40/00 705/37 |
| 2013/0018769 A1 | 1/2013 | Boudreault et al. | |
| 2013/0046710 A1* | 2/2013 | Kartoun | G06Q 40/06 705/36 R |
| 2014/0114720 A1* | 4/2014 | Thind | G06Q 40/04 705/7.28 |
| 2014/0172687 A1* | 6/2014 | Chirehdast | G06Q 40/02 705/38 |
| 2015/0026028 A1 | 1/2015 | Davies et al. | |
| 2015/0379643 A1 | 12/2015 | Boberski et al. | |
| 2018/0033083 A1 | 2/2018 | Kirby et al. | |
| 2018/0068390 A1 | 3/2018 | Wilson, Jr. et al. | |
| 2019/0324433 A1 | 10/2019 | Cella et al. | |

OTHER PUBLICATIONS

STIC EIC Search Report, dated Jun. 2, 2021. (Year: 2021).*
Anonymous, "Effective use of fixed-income pricing models," Bank Systems & Technology, v. 33, No. 8, p. 20, Aug. 1996, 2 pages.
Futures Trader Alert #2018—13, Initial Initial Listing & Margin Notice for U.S. DV01 Treasury Futures Contract for Trade Date Jul. 19, 2018 + OCC Sample SPAN File Available; Monday, Jul. 2, 2018 https:\\www.nasdaqtrader.com/MicroNews.aspx?id=FTA2018-13 (accessed Jul. 18, 2018), 2 pages.
Lavine, A., "VAs Aim to Hedge Against Interest Rate Risk," Annuity Market News, Jul. 1, 2004, 2 pages.
Markham, J. W., "Regulating the U.S. Treasury Market," Marquette Law Review, vol. 100, Issue 1, Fall 2016; http://scholarship.law.marquette.edu/mulr/vol100/iss1/5.
Nasdaq U.S. DV01 Treasury Futures http://business.nasdaq.com/media/Nasdaq-DV01-Treasury-Futures-Contract-Specifications_tcm5044-63486.pdf (accessed Jul. 18, 2018), 2 pages.
"Nasdaq Launches U.S. Treasury Futures Product—NASDAQ.com https://www.nasdaq.com/press-release/nasdaq-launches-us-treasury-futures-product-20180702-00882 (accessed Jul. 18, 2018), 2 pages.".
NPL Search Results for U.S. Appl. No. 14/830,555, dated Sep. 30, 2018 by EIC (2018), 19 pages.
Securities and Exchange Commission (Release No. 34-79116; File No. SR-FINRA-2016-027), Oct. 18, 2016, 40 pages; https://www.sec.gov/rules/sro/finra/2016/34-79116.pdf.
U.S. 10-YR DV01 Treasury Futures (TYDX) http://business.nasdaq.com/media/US-DV01-Treasury-Futures_tcm5044-63486.pdf (accessed Jul. 18, 2018), 2 pages.
When-Issued U.S. Treasury Securties Futures Contracts, Proposed Contract Rules, , 12 pages; https://www.cftc.gov/sites/default/files/files/foia/comment01/foicf0101b001.pdf.

* cited by examiner

SECURE MULTI-SERVER INTEREST RATE BASED INSTRUMENT TRADING SYSTEM AND METHODS OF INCREASING EFFICIENCY THEREOF

This application is a continuation of U.S. application Ser. No. 14/830,555, entitled SECURE MULTI-SERVER INTEREST RATE BASED INSTRUMENT TRADING SYSTEM AND METHODS OF INCREASING EFFICIENCY THEREOF, filed Aug. 19, 2015, which claims priority to and benefit from U.S. provisional application No. 62/039,393, entitled INTEREST RATE BASED FINANCIAL INSTRUMENT APPARATUSES AND SYSTEMS, filed Aug. 19, 2014. The entire content of the aforementioned applications is expressly incorporated by reference herein in their entity.

This application for letters patent discloses and describes various novel innovations and inventive aspects of SECURE MULTI-SERVER INTEREST RATE BASED INSTRUMENT TRADING SYSTEM AND METHODS OF INCREASING EFFICIENCY THEREOF AND ASSOCIATED INTEREST RATE BASED FINANCIAL INSTRUMENT technology (hereinafter collectively "IRFI") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for data and database management, and financial instrument and derivative construction, trading, and management, and more particularly, include SECURE MULTI-SERVER INTEREST RATE BASED INSTRUMENT TRADING SYSTEM AND METHODS OF INCREASING EFFICIENCY THEREOF ("IRFI").

BACKGROUND

Over-The-Counter (OTC) derivatives market contributes a tremendous trading volume including trading standardized swaps that takes place on exchanges or on Swap Execution Facilities (SEFs). Various SEF platforms can be used to trade such swaps. A trading firm usually adopts or builds a technology infrastructure to trade OTC products and derivatives on the SEFs.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

Figure 1:
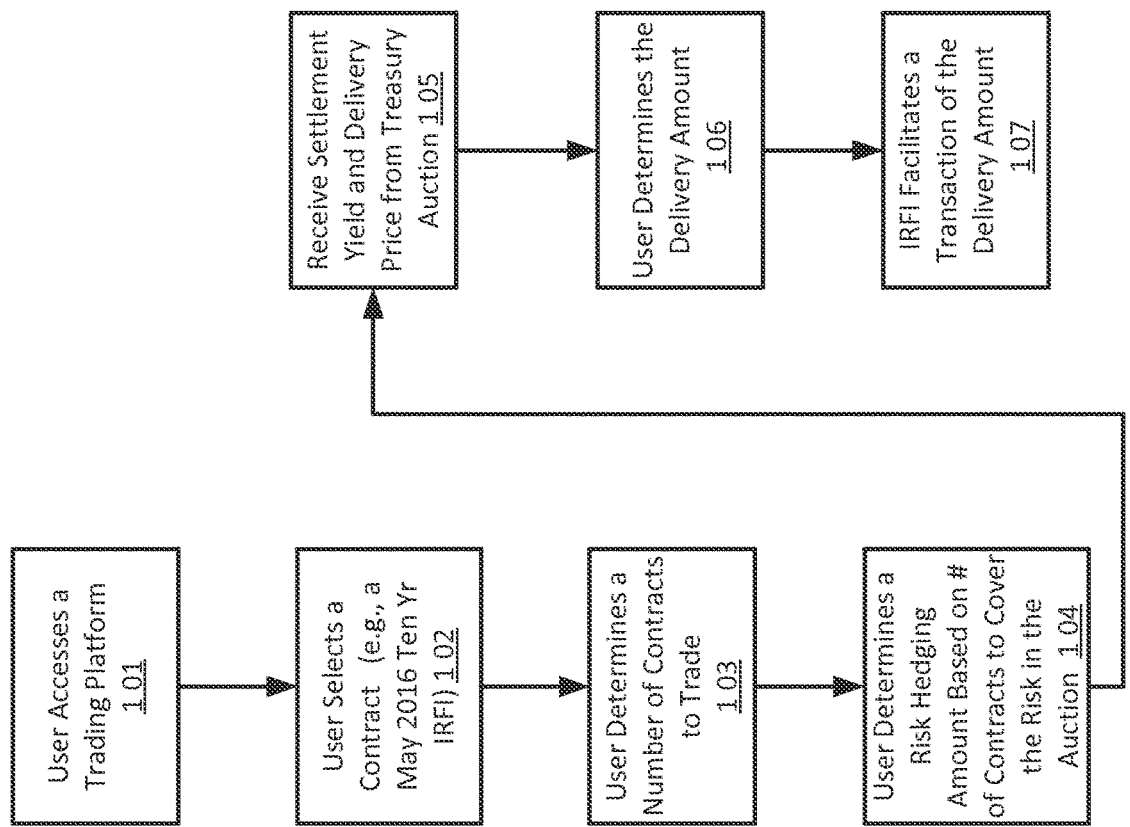
FIG. 1 provides an example logic flow illustrating aspects of a trading strategy including IRFI products, according to one embodiment of the IRFI.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The SECURE MULTI-SERVER INTEREST RATE BASED INSTRUMENT TRADING SYSTEM AND METHODS OF INCREASING EFFICIENCY THEREOF AND ASSOCIATED INTEREST RATE BASED FINANCIAL INSTRUMENT technology (hereinafter collectively "IRFI") provides a secure, efficient platform to construct and manage interest rate based risk future contracts that are traded where the quantity delivered is uniquely determined by a risk value at settlement of the underlying bond or swap (e.g., instead of a fixed notional value). In some embodiments, the IRFI utilizes an artificial neural network that includes three or more layers, with at least one input layer, a hidden layer and an output layer. The IRFI also facilitates efficient transactions.

The Financial Reform Act has allowed standardized Interest Rate Swaps to be traded and transacted on an exchange or on a Swap Execution Facility (SEF). Either format can be utilized for these inventions. The IRFI product set has the capability to be traded on current existing infrastructure in rate without the need to set a notional value or coupon.

In one implementation, the IRFI provides a financial instrument in a format similar to an interest rate risk future, which allows for contracts to trade in round units of forward risk, or Dollar Value of an 01 (DV01). The quantity delivered may be uniquely determined by the risk value at expiration of the underlying bond or swap, instead of a fixed notional value. Round standardized units of risk can make the product elegant to use for hedging, executing curve trades or spreading versus cash products. The risk management of such IRFI products can be transparent. In this way, relationships in futures can be quoted in yield terms and OTC market conventions, rather than complex basis ratios or dollar spreads. For example, initially the IRFI products may include swap interest rate based products, and/or treasury interest rate based products.

For example, all listed futures contracts can specify an amount of the underlying product traded, e.g., wheat trades in bushels, gold trades in oz and bonds trade in notional value. The IRFI contract allows trading in rates products without trading a specific or pre-determined notional size. By transacting units of forward risk or dollar value of a basis point without specifying a fixed quantity, rates products can be traded and/or be quoted in yield utilizing existing futures infrastructure while maintaining the true economics and convexity of the underlying cash or over the counter (OTC) markets. In this way, the IRFI contact can avoid the convexity dilemma as the trades do not need a fixed quantity. The IRFI contract allows option strike prices to be quoted in yield. While Eurodollars and options share this quoting methodology, they may suffer from a convexity issue as the tick value and quantity are both held constant. Other products that assign a coupon are forced to in prices and these prices could have little resemblance to the underlying market at expiration. Thus newer products would require additional support and infrastructure.

In another example, the round risk units per basis point allow simplified hedging and risk management. Since the contracts are based in risk per basis point, the value at risk, is precisely the volatility in basis points multiplied by the number of contracts times the risk unit ($100). These round units make profit and loss calculations more straightforward and more transparent.

In another example, settlement can be determined by the corresponding Treasury Auction, instead of the price of the futures traded. In this way, the IRFI may force full convergence to the Treasury Market, eliminating manipulation and will support and enhance liquidity and transparency of the Treasury Market.

In another example, by quoting products in yield, relationships or spreads can be quoted in simple yield differentials. Currently cash and futures are quoted in price spreads using awkward hedge ratios while the underlying markets are all yield quotes. For example, current listed futures products have different quoting conventions and tic values making spread trading complex. A simple curve trade in the OTC market 2 yr-10 yr would be quoted in yield however the equivalent in treasury basket futures requires executing a fixed dollar spread. Since the tic values of the contracts differ and the weightings are often awkward, one must wait for prices to align in order to achieve the desired theoretical forward yield spread.

In further examples, the IRFI can provide a trading structure with increasing transparency and liquidity in the marketplace simplified settlement and increased liquidity in options with longer expirations.

For example, the $600 Trillion OTC Derivatives Market may be influenced by the implementation of the Dodd-Frank financial reform bill, and such regulations is a mandate for trading standardized Swaps to take place on exchanges or on SEFs. For smaller firms, implementation of trading may suffer due to a lack of infrastructure and reluctance to spend limited technology budgets on various unproven SEF platforms. In addition, increased capital requirements for banks may further add to costs. The Listed Futures Market has an existing infrastructure and may provide an efficient trading platform for centrally cleared OTC derivatives, but the existing product set is complex and embedded with hidden convexity risks. In one implementation, the IRFI may provide a cost effective format for generating, trading, and/or managing forward rates and long term options.

In one implementation, swap and bond convexity pose a hurdle to creating a successful listed futures product. For example, as bond prices move higher, the sensitivity to changes in yields increase; and as bond prices move lower, the sensitivity decreases. Settlement systems may not be dynamic and often may only handle products traded in price or a fixed tick value for products traded in yield. Eurodollars futures may be an example of holding the tick value constant. The application of Eurodollars futures can be limited. Once contracts have expirations over one or two years, the lack of discounting makes hedging extremely tedious and liquidity suffers. Thus, a 10 year swap may require forty contracts executed simultaneously at different prices and in decreasing quantities to adjust for the lack of convexity.

Other workarounds could have designated a fixed coupon. The problem with a fixed coupon is that as rates fluctuate the "couponed security's" market prices do not resemble the underlying OTC product that they are trying to replicate, making trading options even more difficult.

In one implementation, the IRFI constructs an innovative product suite offering end users true OTC economics utilizing an existing infrastructure of a trading firm. The IRFI product may include a fixed income futures product set that improves the convexity situation, which enables rates products to be traded in yield over existing futures infrastructure while maintaining the true economics of the underlying OTC market. The IRFI may allow for contracts to trade where the quantity delivered is uniquely determined by the risk value at settlement of the underlying bond or swap, not a fixed notional value.

FIG. 1 provides an example logic flow illustrating aspects of a trading strategy including IRFI products, according to one embodiment of the IRFI. As shown in FIG. 1, for example, the IRFI user (e.g., an investor, a portfolio manager, a trader, etc.) may initiate and/or access a platform (e.g., a web based application, a mobile component, a server application, etc.) at 101, which may provide a list of listed future contracts to users. The user may select a contract to trade (at 102), e.g., a May 2016 Ten Yr IRFI products which may include a long dated When-Issued (WI) contract on the new 10 year Treasury to be auctioned in May 2016. The user may determine a number of contracts to trade (at 103), wherein the basis point may equal a fixed dollar value of $100, and then determine the risk hedging amount to cover the risk in the auction 104, e.g., hedging $100,000.00 of risk per basis point would simply require 1000 contracts in this example so that the risk can be fully offset. The settlement yield and delivery price may then be determined by the corresponding Treasury Auction, and such information may be provided to the IRFI at 105.

In one implementation, the user may calculate the delivery amount in millions as: the number of Contracts×$100/ dollar value of a basis point per million of the new bond, at 106. The IRFI platform may also optionally facilitate a transaction of the delivery amount at 107, e.g., via an exchange or the OTC market.

Figure 2A:
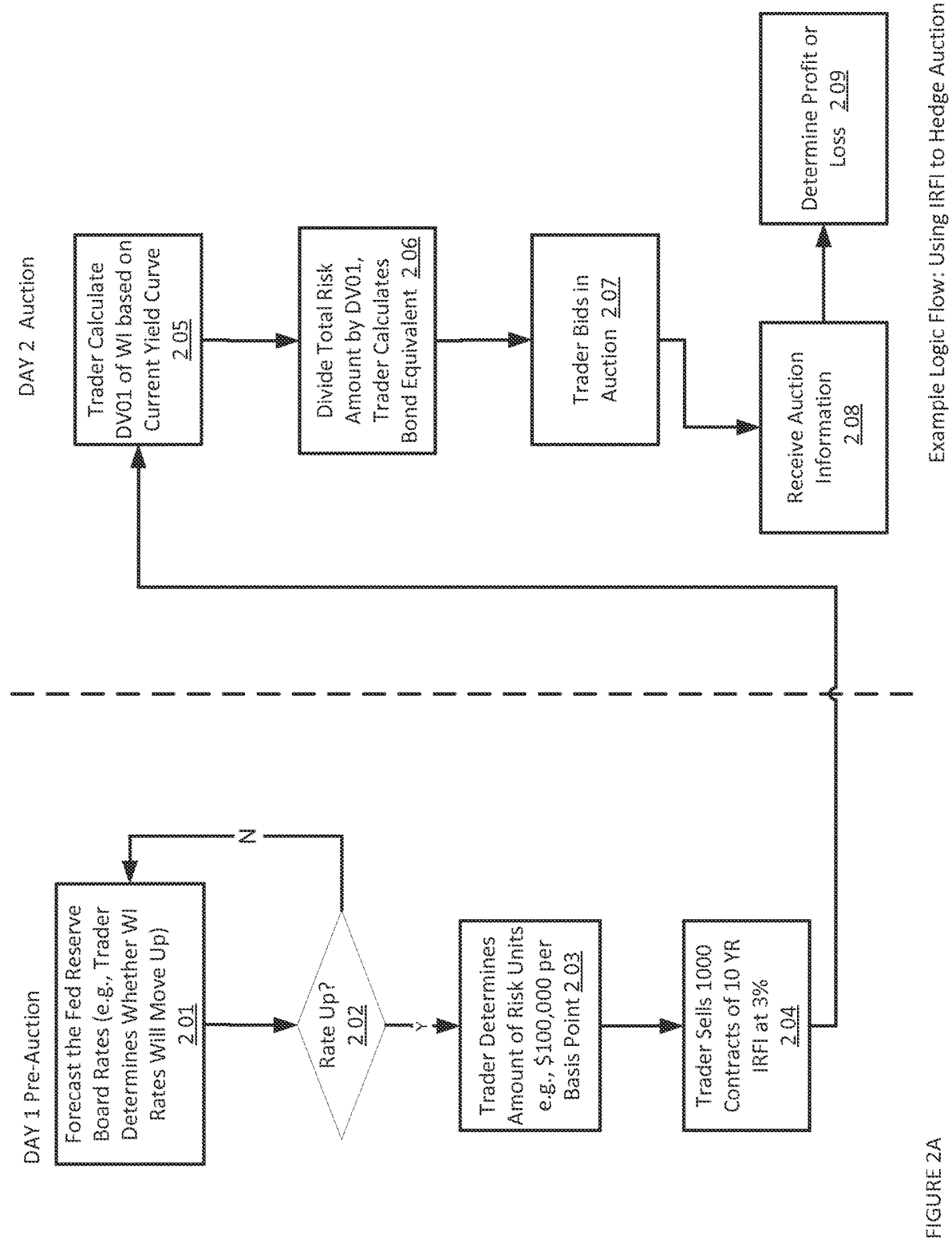
FIG. 2A provides a block diagram illustrating a numeric example of IRFI products trading, according to an embodiment.

FIG. 2A provides a block diagram illustrating a numeric example of IRFI using IRFI products to hedge auction, according to an embodiment. As shown in FIG. 2A, on day 1 (pre-auction), a user (e.g., an investor, a portfolio manager, a trader, etc.) may forecast the rates to determine whether the WI rates will move up at 201. If the user believes the Federal Reserve Board is behind the curve, e.g., at 202, the user may determine an amount of risk units, e.g., to wager $100,000 per basis point that rates will move higher at 203. Otherwise, the user may not wager anything and will keep monitoring the Federal Reserve Board performance at 201. Continuing on with 203, the user may then sell 1000 contracts of the 10 year IRFI products at 3.00% (a price of 97.00) at 204, which settles at 3.01% for a profit of 1 basis point on a mark-to-market, wherein 1 basis point×1000 contracts×$100 tick value=$100,000.

On day 2 (auction), the user may decide to cover his short in the auction. Since rates are close to 3%, the IRFI may calculate the Dollar Value of an 01 (DV01) based on current yield curve to be 833 per million, at 205. Given the $100,000 in risk, the user may divide the total risk amount by the DV01 per million and calculate bond equivalent, e.g., 120 million in bonds is needed, at 206. The user may then submit bids in the auction at 207, and receive auction information at 208. The user can then determine a profit or loss from the trades at 209 (e.g., number of contracts×(auction yield−yield of the IRFI products transaction)). For example, if the auction result comes at 3.06% and the user earns an additional $500,000 (e.g., 5×$1000 contracts×$100 tick value) as the user's short position settles there. The user's short futures may produce an obligation of a 120 mm sale at 3.06% on the WI which is neatly netted versus the purchase of 120 mm at 3.06%.

Figure 2B:
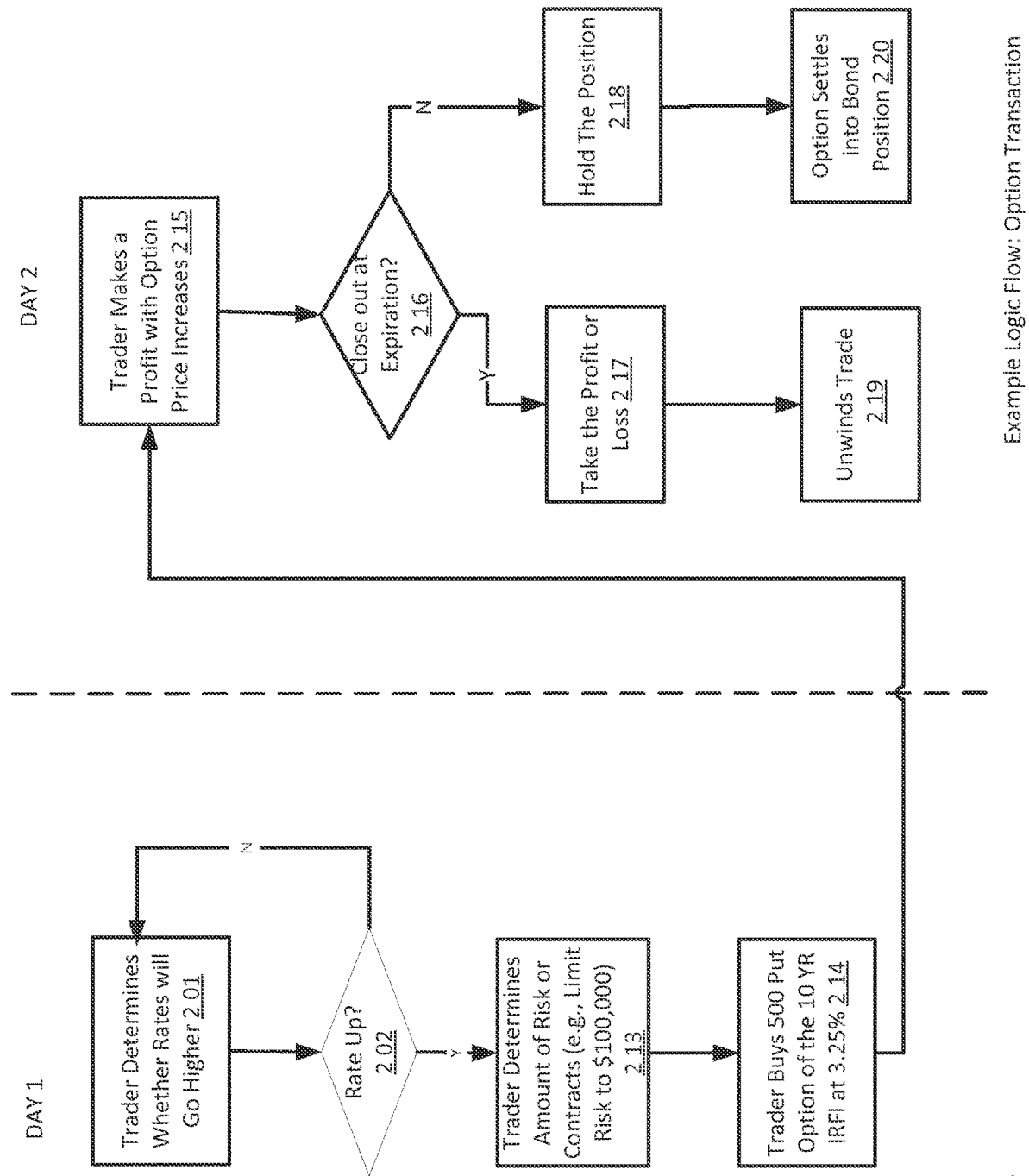
FIG. 2B provides a block diagram illustrating a numeric example of IRFI products trading of an option, according to an embodiment.

FIG. 2B provides a block diagram illustrating a numeric example of IRFI products trading of an option, according to an embodiment. On day 1, a user may determine whether rates will move up at 201. If the user believes the Federal Reserve Board is behind the curve, e.g., at 202, the user may determine an amount of risk or contracts to trade, e.g., by limiting his risk to $100,000 (at 213). The user may buy 500 put option contracts of the 10 YR IRFI products at 3.25% (a price of 96.75) with a six month expiration for a premium of 2 basis points (at 214). The cost is 500 contracts×2 basis points×$100 for a total premium of $100,000. at a breakeven of 96.73.

On day 2, the market may sell off sharply and the option price moves from 2 basis points to 4. The user makes a profit with option price increases, and thus has a mark-to-market profit of $100,000 (at 215). On option expiration the user may determine whether to close out the transaction (at 216). For example, the user can either hold his position if in the money and become short 500 futures at 97.75 (at 218), and the option can settle into a bond position 220. In this way, the user was able to make an option transaction on a ten year rate (at 219), six months forward, in an efficient format. Or alternatively, he can take profit or a loss by closing out the transaction (at 217), and unwind the trade at 219.

In one implementation, the IRFI facilitates trading forward rates and options on a liquid and widely watched benchmark. The IRFI permits options to be quoted and traded in basis points. Strikes are then struck at yield levels and longer expiration periods may be possible. In this way, the curve trades may be straightforward to users, and the user may not need to comprehend complex ratios (e.g., the trading data is a 1-1 spread since units are already risk weighted). The IRFI, via the~forward option markets, can offer a listed alternative to the OTC Swap Options Market, using IRFI products on existing futures infrastructure, which permits participants from other arenas to hedge and transact in fixed income in a straightforward manner.

In one implementation, unlike other deliverable interest rate swap futures (e.g., Chicago Mercantile Exchange (CME) Group's interstate rate swap futures) that have a complicated delivery process scanning multiple days, and a lottery process to match longs vs shorts with bi-lateral exposures, IRFI products delivery is simple. For example, long futures have an obligation to buy at settlement the WI via Fixed Income Clearing Corporation (FICC) so it is equivalent to purchasing at the auction, and shorts become sales.

For another example, the IRFI may improve the conditions of CME Treasury Basket Futures that are plagued with embedded options, complex rules and require sophisticated trading models. In some instances, valuation can be difficult as contracts price off of a basket of bonds with various coupons, prices and durations. They do not reflect or track the major OTC benchmark. Most existing valuation models require assumptions on Repo financing, the shape of the yield curve, market direction and even volatility parameters. Basic OTC quoting and spreading conventions thus may not be applied to this contract. There is no yield to quote, and therefore a simple yield curve trade often requires awkward ratios that are difficult to execute without a computer program. Factor weightings, the exchange hedge ratio, may create an unwanted directional bias. Weightings and hedge ratios often change as does the composition of the bond basket. All these factors above may complicate forward analysis and therefore options may not have liquidity beyond the front two contracts. Physical delivery is required and most Future Commission Merchants (FCMs) may demand that the bonds are "boxed" for safe keeping. This in the past has caused a disruption the float of "cheapest-to-deliver" bonds resulting in fails in the FED Wire system.

As another example, unlike other deliverable interest rate swap futures that require complex analytics to derive the invoice yield spread, the forward yield spread of IRFI products can be obtained via subtraction between the two. The following table provides an example comparison between the IRFI products and the CME basket future:

|  | Cash market | IRFI PRODUCTS | CME basket future |
| --- | --- | --- | --- |
| Description | WI on new Treasury | Listed future WI on new Treasury | Listed future on basket of Treasuries |
| Quoting | Yield | Yield | Price |
| Valuation | FWD yield Must assume coupon | FWD yield No need to assume coupon | Price based on optionality. Requires assumption on direction, curve, repo and volatility |
| Flexibility | Negotiated/ CLOB/RFQ | Negotiated/ CLOB/RFQ | CLOB/only massive blocks can circumvent |
| Convexity | Positive | Positive | Negative |
| Settlement |  |  | Last two minutes of trade |
| Delivery | FICC/FedWire | FICC/FedWire | Complex, risk of early delivery, risk of delivery after market close, FCM mandate securities to be "boxed" for safekeeping |

In this case, the IRFI may appeal to the majority of the users for a straightforward trading platform based on existing infrastructure. The IRFI may facilitate revenue generating, as the benchmark treasuries dominate over 600 billion daily transactions in Inter-Dealer market, and treasury futures can add 200-300 billion in notional transactions daily. The IRFI may attract hedging and trading activity not only from the Interest Rate Swap (IRS) market or Treasury market but from all fixed income markets that utilize IRS or Treasuries to hedge. By using IRFI, trading in options may exceed volumes of the underlying futures as options may have major influence of the market, which may offer a listed alternative to the massive yet less transparent Swap Option Market. In this way, transaction fees and exchange fees could contribute to the potential revenue as well, which may surpass millions in daily revenue.

IRFI Controller

Figure 3:
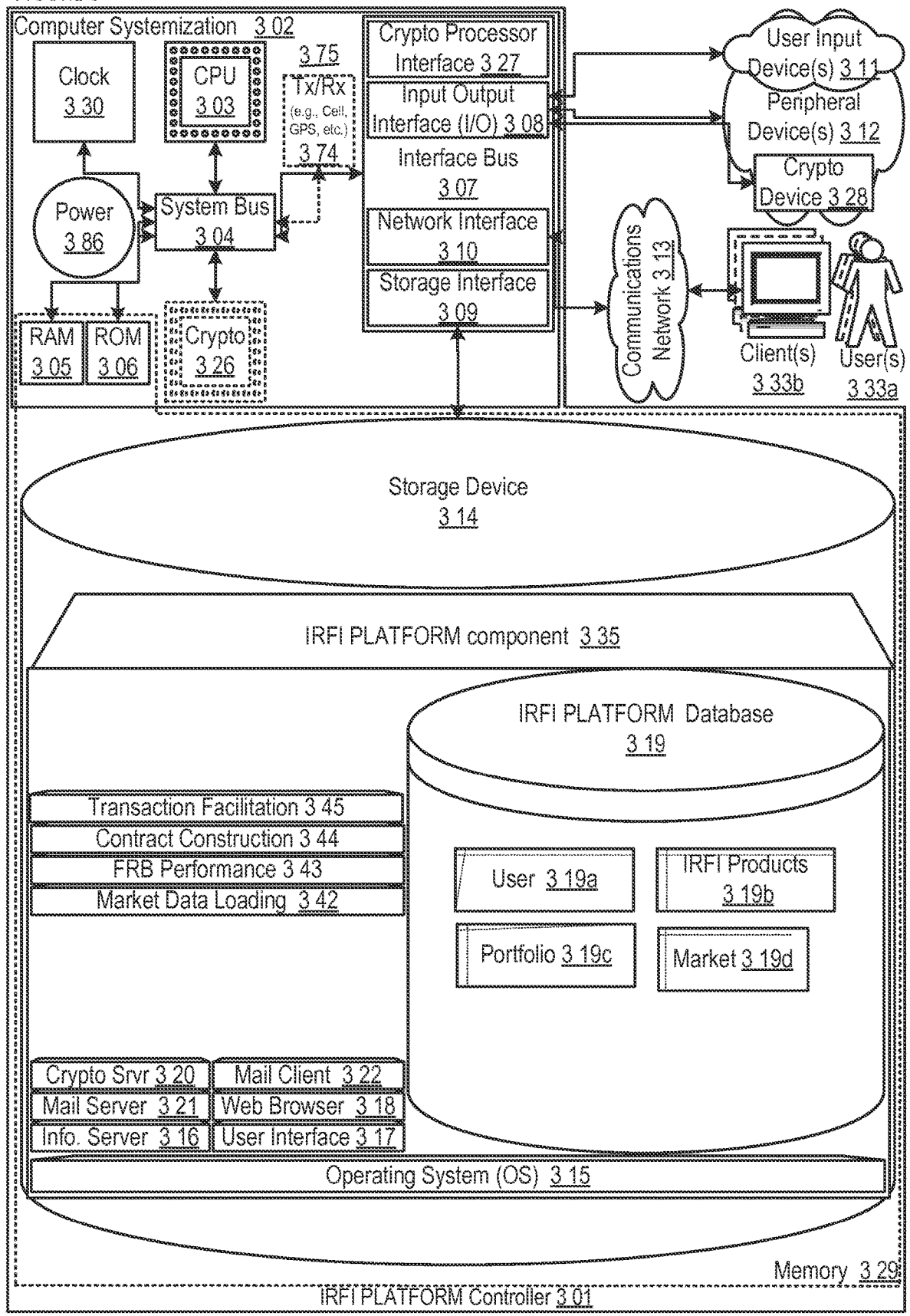
FIG. 3 shows a block diagram illustrating example aspects of an IRFI controller.

FIG. 3 shows a block diagram illustrating example aspects of a IRFI controller 301. In this embodiment, the IRFI controller 301 may serve to aggregate, process, store, search, serve, identify, instruct, generate, match, and/or facilitate interactions with a computer through various technologies, and/or other related data.

Users, e.g., 333a, which may be people and/or other systems, may engage information technology systems (e.g., computers) to facilitate information processing. In turn, computers employ processors to process information; such processors 303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the IRFI controller 301 may be connected to and/or communicate with entities such as, but not limited to: one or more users from user input devices 311; peripheral devices 312; an optional cryptographic processor device 328; and/or a communications network 313. For example, the IRFI controller 301 may be connected to and/or communicate with users, e.g., 333a, operating client device(s), e.g., 333b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The IRFI controller 301 may be based on computer systems that may comprise, but are not limited to, components such as: a computer systemization 302 connected to memory 329.

Computer Systemization

A computer systemization 302 may comprise a clock 330, central processing unit ("CPU(s)" and/or "processor(s)" (these terms are used interchangeably throughout the disclosure unless noted to the contrary)) 303, a memory 329 (e.g., a read only memory (ROM) 306, a random access memory (RAM) 305, etc.), and/or an interface bus 307, and most frequently, although not necessarily, are all interconnected and/or communicating through a system bus 304 on one or more (mother)board(s) 302 having conductive and/or otherwise transportive circuit pathways through which instructions (e.g., binary encoded signals) may travel to effectuate communications, operations, storage, etc. The computer systemization may be connected to a power source 386; e.g., optionally the power source may be internal. Optionally, a cryptographic processor 326 and/or transceivers (e.g., ICs) 374 may be connected to the system bus. In another embodiment, the cryptographic processor and/or transceivers may be connected as either internal and/or external peripheral devices 312 via the interface bus I/O. In turn, the transceivers may be connected to antenna(s) 375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing IRFI controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the IRFI controller and beyond through various interfaces. Should processing requirements dictate a greater amount speed and/or capacity, distributed processors (e.g., Distributed IRFI), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the IRFI may be achieved by implementing a microcontroller such as CAST's R8051XC2 microcontroller; Intel's MCS 51 (i.e., 8051 microcontroller); and/or the like. Also, to implement certain features of the IRFI, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the IRFI component collection (distributed or otherwise) and/or features may be implemented via the microprocessor and/or via embedded components; e.g., via ASIC, coprocessor, DSP, FPGA, and/or the like. Alternately, some implementations of the IRFI may be implemented with embedded components that are configured and used to achieve a variety of features or signal processing.

Depending on the particular implementation, the embedded components may include software solutions, hardware solutions, and/or some combination of both hardware/software solutions. For example, IRFI features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the IRFI features. A hierarchy of programmable interconnects allow logic blocks to be interconnected as needed by the IRFI system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the IRFI may be developed on regular FPGAs and then migrated into a fixed version that more resembles ASIC implementations. Alternate or coordinating implementations may migrate IRFI controller features to a final ASIC instead of or in addition to FPGAs. Depending on the implementation all of the aforementioned embedded components and microprocessors may be considered the "CPU" and/or "processor" for the IRFI.

Power Source

The power source 386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 386 is connected to at least one of the interconnected subsequent components of the IRFI thereby providing an electric current to all the interconnected components. In one example, the power source 386 is connected to the system bus component 304. In an alternative embodiment, an outside power source 386 is provided through a connection across the I/O 308 interface. For example, a USB and/or IEEE 1394 connection carries both data and power across the connection and is therefore a suitable source of power.

Interface Adapters

Interface bus(ses) 307 may accept, connect, and/or communicate to a number of interface adapters, frequently, although not necessarily in the form of adapter cards, such as but not limited to: input output interfaces (I/O) 308, storage interfaces 309, network interfaces 310, and/or the like. Optionally, cryptographic processor interfaces 327 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 309 may accept, communicate, and/or connect to a number of storage devices such as, but not limited to: storage devices 314, removable disc devices, and/or the like. Storage interfaces may employ connection protocols such as, but not limited to: (Ultra) (Serial)

Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 310 may accept, communicate, and/or connect to a communications network 313. Through a communications network 313, the IRFI controller is accessible through remote clients 333b (e.g., computers with web browsers) by users 333a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed IRFI), architectures may similarly be employed to pool, load balance, and/or otherwise increase the communicative bandwidth required by the IRFI controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 310 may be used to engage with various communications network types 313. For example, multiple network interfaces may be employed to allow for the communication over broadcast, multicast, and/or unicast networks.

Input Output interfaces (I/O) 308 may accept, communicate, and/or connect to user input devices 311, peripheral devices 312, cryptographic processor devices 328, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 311 often are a type of peripheral device 312 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 312 may be connected and/or communicate to I/O and/or other facilities of the like such as network interfaces, storage interfaces, directly to the interface bus, system bus, the CPU, and/or the like. Peripheral devices may be external, internal and/or part of the IRFI controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 328), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the IRFI controller may be embodied as an embedded, dedicated, and/or monitor-less (i.e., headless) device, wherein access may be provided over a network interface connection.

Cryptographic units such as, but not limited to, microcontrollers, processors 326, interfaces 327, and/or devices 328 may be attached, and/or communicate with the IRFI controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 329. However, memory is a fungible technology and resource, thus, any number of memory embodiments may be employed in lieu of or in concert with one another. It is to be understood that the IRFI controller and/or a computer systemization may employ various forms of memory 329. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 329 may include ROM 306, RAM 305, and a storage device 314. A storage device 314 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 329 may contain a collection of program and/or database components and/or data such as, but not limited to: operating system component(s) 315 (operating system); information server component(s) 316 (information server); user interface component(s) 317 (user interface); Web browser component(s) 318 (Web browser); database(s) 319; mail server component(s) 321; mail client component(s) 322; cryptographic server component(s) 320 (cryptographic server); the IRFI component(s) 335; and/or the like (i.e., collectively a component collection). These components may be stored and accessed from the storage devices and/or from storage devices accessible through an interface bus. Although non-conventional program components such as those in the component collection may be stored in a local storage device 314, they may also be loaded and/or stored in memory such as: peripheral devices, RAM, remote storage facilities through a communications network, ROM, various forms of memory, and/or the like.

Operating System

The operating system component 315 is an executable program component facilitating the operation of the IRFI controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the IRFI controller to communicate with other entities through a communications network 313. Various communication protocols may be used by the IRFI controller as a subcarrier transport mechanism for interaction, such as, but not limited to: multicast, TCP/IP, UDP, unicast, and/or the like.

Information Server

An information server component 316 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the IRFI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the IRFI database 319, operating systems, other program components, user interfaces, Web browsers, and/or the like.

Access to the IRFI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the IRFI. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the IRFI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 317 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 318 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the IRFI equipped nodes. The combined application may be nugatory on systems employing standard Web browsers.

Mail Server

A mail server component 321 is a stored program component that is executed by a CPU 303. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the IRFI.

Access to the IRFI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 322 is a stored program component that is executed by a CPU 303. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 320 is a stored program component that is executed by a CPU 303, cryptographic processor 326, cryptographic processor interface 327, cryptographic processor device 328, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the IRFI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the IRFI component to engage in secure transactions if so desired. The cryptographic component facilitates the secure accessing of resources on the IRFI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The IRFI Database

The IRFI database component 319 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the IRFI database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the IRFI database is implemented as a data-structure, the use of the IRFI database 319 may be integrated into another component such as the IRFI component 335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 319 includes several tables 319a-d. A Users table 319a may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on an IRFI. An IRFI PRODUCTS table 319b may include fields such as, but not limited to: IRFI PRODUCTS_date, IRFI products_type, IRFI products_rate, IRFI products_amount, IRFI products_expiration, IRFI products_bond, and/or the like. A Portfolio 319c may include fields such as, but not limited to: portfolio_id, portfolio_user_id, portfolio_IRFI products_id, portfolio_IRFI products_id, portfolio_hedging, portfolio_amount, portfolio_date, and/or the like. A market data table 319d includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the IRFI database may interact with other database systems. For example, employing a distributed database system, queries and data access by search IRFI component may treat the combination of the IRFI database, an integrated data security layer database as a single database entity.

In one embodiment, user programs may contain various user interface primitives, which may serve to update the IRFI. Also, various accounts may require custom database tables depending upon the environments and the types of clients the IRFI may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 319a-d. The IRFI may be configured to keep track of various settings, inputs, and parameters via database controllers.

The IRFI database may communicate to and/or with other components in a component collection, including itself, and/or facilities of the like. Most frequently, the IRFI database communicates with the IRFI component, other program components, and/or the like. The database may contain, retain, and provide information regarding other nodes and data.

The IRFIs

The IRFI component 335 is a stored program component that is executed by a CPU. In one embodiment, the IRFI component incorporates any and/or all combinations of the aspects of the IRFI discussed in the previous figures. As such, the IRFI affects accessing, obtaining and the provision of information, services, transactions, and/or the like across various communications networks. The features and embodiments of the IRFI discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the IRFI's features and facilities, and in many cases reduce the costs, energy consumption/requirements, and extend the life of IRFI's underlying infrastructure; this has the added benefit of making the IRFI more reliable. Similarly, many of the features and mechanisms are designed to be easier for users to use and access, thereby broadening the audience that may enjoy/employ and exploit the feature sets of the IRFI; such ease of use also helps to increase the reliability of the IRFI. In addition, the feature sets include heightened security as noted via the Cryptographic components 320, 326, 328 and throughout, making access to the features and data more reliable and secure.

The IRFI component may transform market data (e.g., see Federal Reserve Board performance at 201 in FIG. 2B, etc.) via IRFI components, such as but not limited to a market data loading component 342 (e.g., 201 in FIGS. 2A-2B, etc.), Federal Reverse Board performance analysis component 343 (e.g., see 201 in FIGS. 2A-2B, etc.), Contract Construction component 344 (e.g., see 102-103 in FIG. 1, etc.), Transaction facilitation component 345 (e.g., see 107 in FIG. 1, etc.), and/or the like into a financial transaction 542 (e.g., 219 in FIG. 2B, etc.), and/or the like and use of the IRFI.

The IRFI component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the IRFI server employs a cryptographic server to encrypt and decrypt communications. The IRFI component may communicate to and/or with other components in a component collection, including itself, and/or facilities of the like. Most frequently, the IRFI component communicates with the IRFI database, operating systems, other program components, and/or the like. The IRFI may contain, communicate, generate, obtain, and/or provide program component, system, user, and/or data communications, requests, and/or responses.

Distributed IRFIs

The structure and/or operation of any of the IRFI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the IRFI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:
   w3c-post http:// . . . Value1
   where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the IRFI controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:
   <?PHP
   header('Content-Type: text/plain');
   //set ip address and port to listen to for incoming data
   $address='192.168.0.100';
   $port=255;
   //create a server-side SSL socket, listen for/accept incoming communication
   $sock=socket_create(AF_INET, SOCK_STREAM, 0);
   socket_bind($sock, $address, $port) or die('Could not bind to address');
   socket_listen($sock);
   $client=socket_accept($sock);
   //read input data from client device in 1024 byte blocks until end of message do {
   $input=" ";
   $input=socket_read($client, 1024);
   $data.=$input;
   } while($input !=" ");
   //parse data to extract variables
   $obj=json_decode($data, true);
   //store input data in a database
   mysql_connect("201.408.185.132",$DBserver,$password); //access database server mysql_select("CLIENT_DB.SQL"); //select database to append
   mysql_query("INSERT INTO UserTable (transmission) VALUES ($data)"); //add data to UserTable table in a CLIENT database
   mysql_close("CLIENT_DB.SQL"); //close connection to database
   ?>

Also, the following resources may be used to provide example embodiments regarding SOAP parser implementation:
   http://www.xav.com/perl/site/lib/SOAP/Parser.html
   http://publib.boulder.ibm.com/infocenter/tivihelp/v2r1/index.jsp?topic=/com.ibm.IBMDI.doc/referenceguide295.htm
   and other parser implementations:
   http://publib.boulder.ibm.com/infocenter/tivihelp/v2r1/index.jsp?topic=/com.ibm.IBMDI.doc/referenceguide259.htm
   all of which are hereby expressly incorporated by reference herein.

Figure 4:
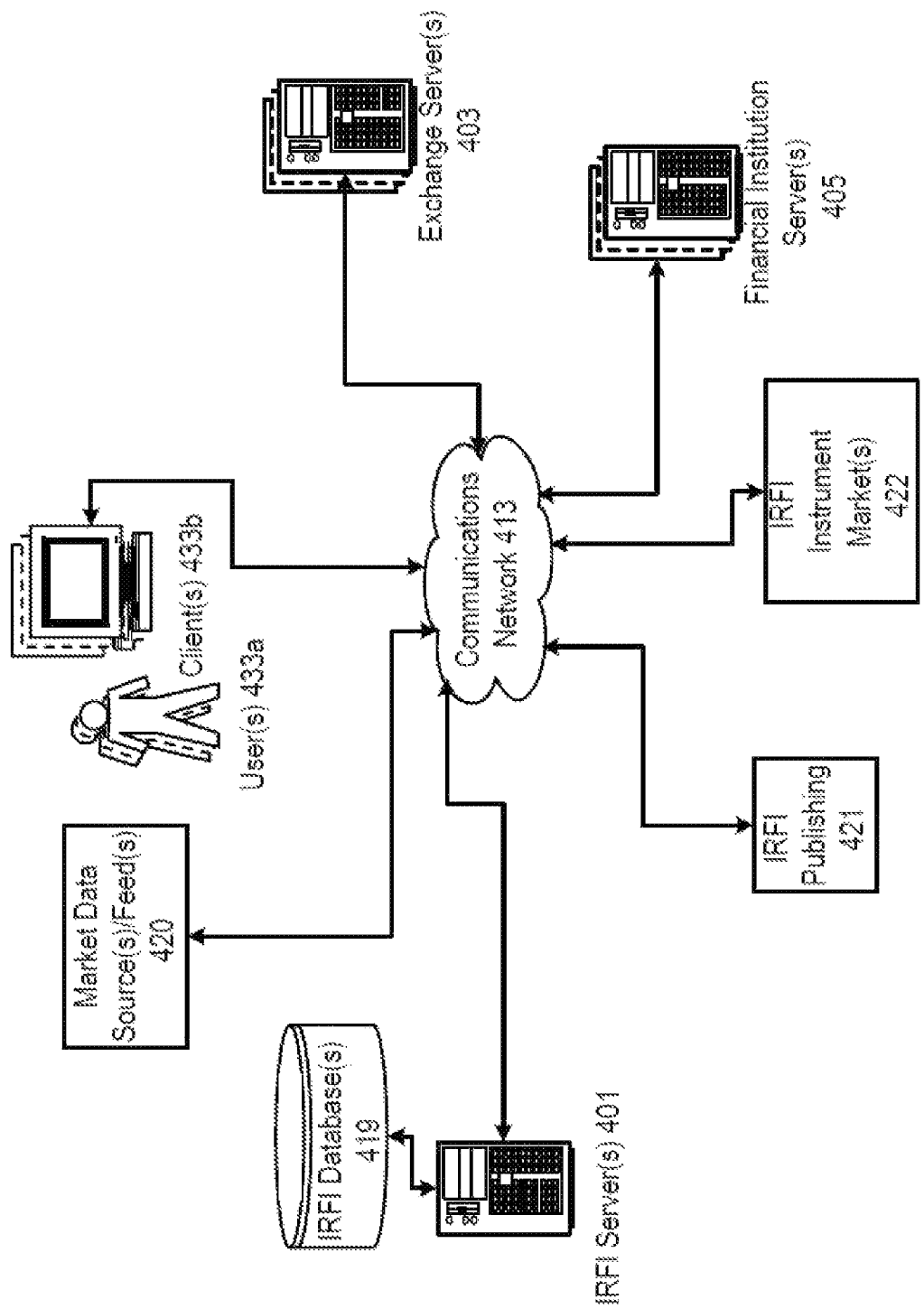
FIG. 4 is a schematic diagram illustrating data flows between IRFI components and associated entities for an embodiment of the IRFI.

FIG. 4 is a schematic diagram illustrating data flows between IRFI components and associated entities for an embodiment of the IRFI. In one implementation, the IRFI comprises one or more IRFI servers 401 implementing IRFI functionality and communicatively coupled to one or more IRFI databases 419, configured to store IRFI and associated data. The IRFI server 401 may also be coupled by a communication network 413 to one or more market data sources and/or market data feeds 120 (e.g., Bloomberg, Bloomberg's PhatPipe, Dun & Bradstreet, Reuters, etc.) to request and/or receive financial data used in the calculation, determination, generation, management, settlement, maintenance, and/or associated activities for the IRFI. A wide variety of different data may be received and/or requested, including but not limited to stock, derivative, security and/or other market data, specific pricing, risk, and/or the like data for individual securities and/or financials product, sets or portfolios of securities and/or financial products, and/or the like. The IRFI and/or associated systems/sub-systems and/or components/sub-components may process such market information to determine, calculate, generate, facilitate, and/or execute transactions. Such market information may also be utilized by the IRFI to generate, manage, oversee, promote, distribute, sell, buy, write, market, settle, trade, and/or maintain financial products/instruments. As such, depending on the implementation, IRFI server(s) may communicate with clients/users 433a/433b, publishing systems, entities, organizations, and/or components 421, exchange servers 403 (e.g., for exchange entities, securities marketplaces, regulators, etc.), financial institution servers 405 (e.g., for banks, brokerage houses, etc.), and/or a variety of markets 422.

Figure 5:
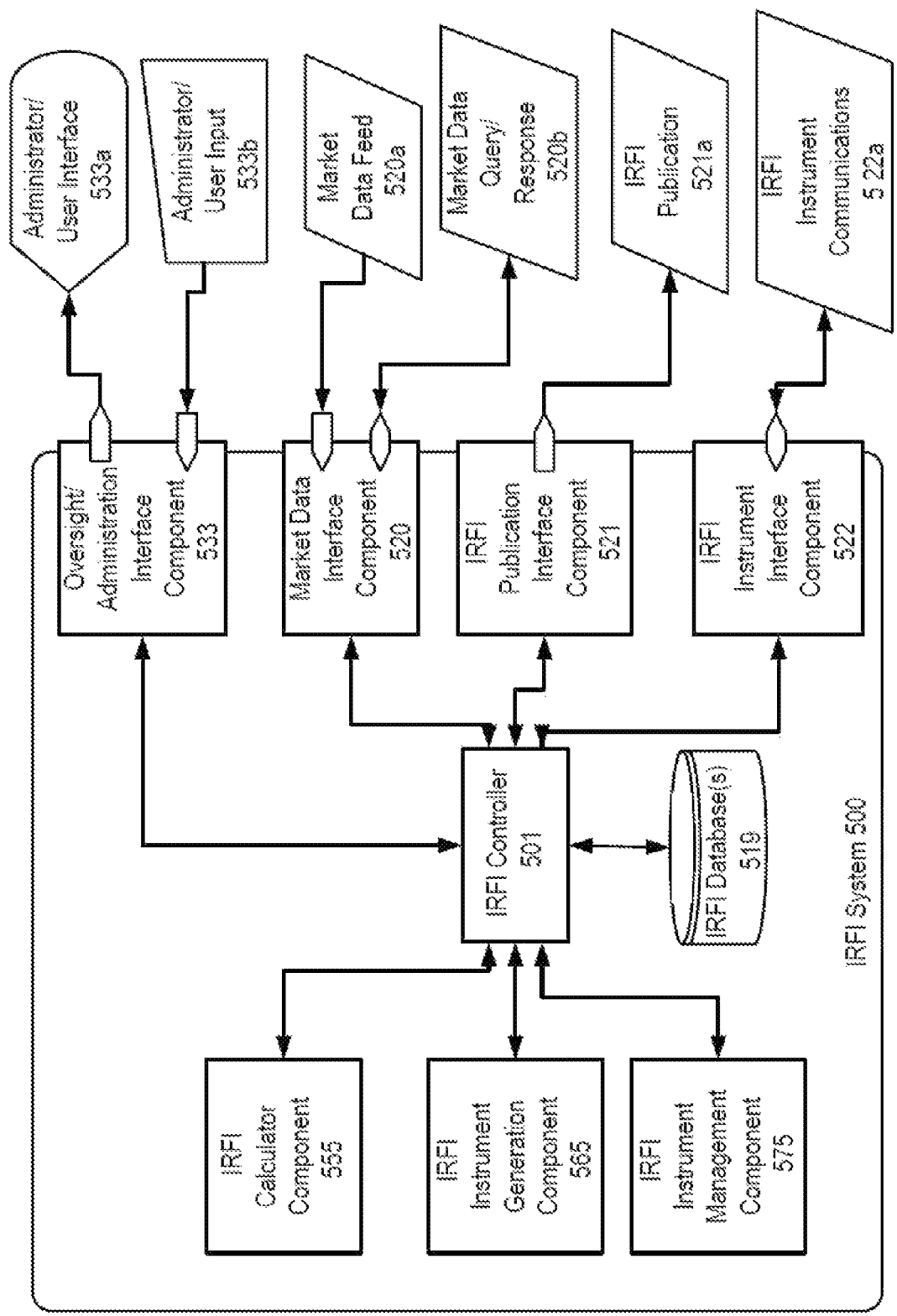
FIG. 5 illustrates aspects of IRFI system architecture in block-diagram form and data flow between and among various IRFI system components for operation of one embodiment of the IRFI.

FIG. 5 illustrates aspects of IRFI system architecture in block-diagram form and data flow between and among various IRFI system components for operation of one embodiment of the IRFI. An IRFI system 500 may include a number of functional/operational modules and/or data stores configured to carry out various IRFI features and/or functionality. A IRFI controller 501 may serve a central role in some embodiments of IRFI operation, orchestrating the reception, determination, generation, transmission and/or distribution of data and/or instructions to, from and between IRFI modules and/or allow further utilization and/or analysis of data generated and/or collected during IRFI operation, and/or storage of data in one or more databases 519. The IRFI controller 501 may be coupled to one or more operational modules configured to implement various features associated with aspects of IRFI operation.

In one implementation, the IRFI controller 501 may be coupled to a market data interface component 520 configured to query and/or receive market data from one or more market data sources 520a and/or feeds 520b, and/or the like.

In one implementation, the IRFI controller 501 may be coupled to a calculator component 555 that processes received and/or stored data (e.g., received via the market data interface component 520 and/or stored in the database(s) 519) to determine/calculate one or more IRFI products.

In some implementations, the calculator component 555 can include an artificial neural network trained to calculate a risk hedging amount and/or a delivery amount for a contract. Such an artificial neural network can be, for example, a multilayer perceptron feedforward artificial neural network. The neural network can include three or more layers, with at least one input layer, a hidden layer and an output layer. The input layer can receive one or more of a value representing a basis point for a contract, a number of contracts to cover a risk in an auction, pricing data, settlement yield values, and/or delivery price values. The hidden layer(s) can map the values received through the input layer via one or more nonlinear functions to generate IRFI products, included but not limited to a risk hedging amount and/or a delivery amount for a contract.

Alternatively, or additionally, the calculator component can include a fuzzy logic inference system, for example, a Mamdani-type fuzzy logic system. The fuzzy logic system can include an inference engine logically coupled to a rule base with rules elicited from previous data samples and/or experts' knowledge. The rules included in the rule base can be utilized to predict and/or calculate a risk hedging amount and/or a delivery amount for a contract. The fuzzy logic system can receive one or more of a value representing a basis point for a contract, a number of contracts to cover a risk in an auction, pricing data, settlement yield values, and/or delivery price values. Thereafter, the system can fuzzyfy the inputs which may trigger, and fire, via the inference engine, one or more rules included in the rulebase. In some implementations, the inference engine outputs one or more fuzzyfy values which are defuzzified by a defuzzifier component to generate IRFI products, included but not limited to a risk hedging amount and/or a delivery amount for a contract.

In one implementation, the IRFI controller 501 may be coupled to a publication interface component 521 configured to publish, transmit, communicate, distribute, etc., IRFI information 521a (e.g., IRFI values determined by the calculator component 555).

In some implementations, the IRFI controller 501 may be coupled to an instrument interface component 522 configured to distribute, receive, transmit, respond, generate, monitor, etc., information pertaining to IRFI instruments 522a, for example, to effectuate and/or monitor instrument transactions and/or the like (e.g., with an exchange server 403).

In one implementation, the IRFI controller 501 may further be coupled to an oversight/administration interface component 533 configured to communicate and/or provide a user interface 533a through which an administrator can monitor and/or interact 533b with IRFI system parameters and settings, data management, access controls, and/or the like.

In some implementations, the IRFI controller 501 may be coupled to an IRFI instrument generation component 565 and/or instrument management component 575 that process determined IRFI information and/or other stored/received data (e.g., received via the instrument interface component 522 and/or stored in the database(s) 519) to generate IRFI instruments and/or associated information and/or facilitate the management of the same. Depending on the implementation, the IRFI and/or associated components may generate and/or manage a variety of IRFI-based financial products/instruments.

According to some embodiments, the IRFI comprises or provides an interest based instrument exchange apparatus that includes a processor, a memory storing processor-readable instructions, the processor-readable instructions being executable by the processor to: instantiate a trading platform; receive a user selection of a contract including characteristic parameters associated with the contract; receive a user-selected number of contracts to trade associated with a basis point for the contract; determine a risk hedging amount based on the basis point for the contract and the user selected number of contracts to cover a risk in an auction; receive pricing data from an auction system, including a settlement yield and a delivery price; determine a delivery amount for the contract based on the pricing data; and facilitate a transaction of the delivery amount. In some embodiments, the contract is traded based on units of forward risk or Dollar Value of a basis point without a fixed notional value. This keeps the actual quantity in line with the forward risk during the life of the Interest Rate Based Financial Instrument (IRBFI). This holds the price movement associated with the change in yield constant, without the need to execute a complex yield-to-price calculation which is an iterative process and takes multiple attempts. The IRFI thereby increases speed and efficiency in trading. By contrast, other products require calculations of Net Present Values, over an interpolated yield curve in order to determine the price of a product and thereby it's change to a change in yield. The IRFI provides an elegant solution of, for example, 100-yield to calculate a price while constantly keeping the forward risk in line with the notional value during the life of the IRBFI.

In some embodiments of the IRFI, the settlement of the transaction can be or is determined by the corresponding Treasury Auction rather than requiring a separate calculation or methodology to derive the final settlement. This eliminates the ability of manipulation, while forcing convergence to the underlying security and saves time. Again, with the solution provided by the IRFI, there is no need for additional system calculations. In some implementations, active treasury futures are traded after an auction and the coupon established, the IRFI or associated IRBFI permits trading in future treasury Auctions in an elegant manner where the coupon has not as yet been established.

In some embodiments, the IRBFI is in round units of risk, inter-relationships or spread trading is in logical fixed ratios and is constant. By contrast, Current Tick values on available contracts that are calculated off of the notional can create odd or awkward increments. The Fed Funds value for example is 41.67 since it is a monthly rate on a $5 mm. This creates difficult ratios when spread versus Eurodollars or Treasury Bonds. According to some embodiments of the IRFI, the IRBFI risk of a basis point movement is fixed, not variable, making the ratios constant. Accordingly, then can be hard coded, and no longer require complex calculations or valuations (and the associated computation requirements. The IRFI thereby facilitates spread trading in yield or price elegant and straightforward (and again, reduces required computations and computer communications. Thus, algorithms are no longer required to make constant adjustments or be fine tuned to transact. Current Treasury basket futures require modeling and analytics, yet since the actual deliverable is unknown, it can not truly trade in yield. Therefore, yield spreads are not possible and weighted dollar price spreads are used to execute spread transactions. These weighted dollar spreads do not account for accruals and do not provide historic references.

In one embodiment, the IRFI may provide a method of increasing processor efficiency for a multi-server trading system providing interest-based instrument exchange, the method comprising: instantiating a trading platform on a first server; receiving a user selection of a contract from a second server, the selection including characteristic parameters associated with the contract; receiving a user-selected number of contracts to trade associated with a basis point for the contract from the second server; determining, via the first server, a risk hedging amount based on the basis point for the contract and the user selected number of contracts to cover a risk in an auction; receiving pricing data from a third server associated with an auction system, the pricing data including a settlement yield and a delivery price; determining a delivery amount for the contract based on the received pricing data at the first server; and facilitating a transaction of the delivery amount. In some embodiments, the contract is traded based on units of forward risk or Dollar Value of a basis point without a fixed notional value. This keeps the actual quantity in line with the forward risk during the life of the Interest Rate Based Financial Instrument (IRBFI). This holds the price movement associated with the change in yield constant, without the need to execute a complex yield-to-price calculation which is an iterative process and takes multiple attempts. The IRFI thereby increases speed and efficiency in trading. By contrast, other products require calculations of Net Present Values, over an interpolated yield curve in order to determine the price of a product and thereby it's change to a change in yield. The IRFI provides an elegant solution of, for example, 100-yield to calculate a price while constantly keeping the forward risk in line with the notional value during the life of the IRBFI.

In some embodiments, the IRFI allows end users to transact and hedge using logical benchmarks. The IRFI provides an instrument that is non-complex to trade and straightforward to transact. The IRFI can provide an instrument that concentrates liquidity even out into the future and where the risk is always known and transparency is inherent.

In some embodiments, the IRFI provides treasury interest rate risk futures that allow for trades in yield. In some implementations, price is simply 100-yield and each basis point is a round unit of "Risk" or DV01. In some embodiments of the IRFI, the treasury interest rate risk futures trades and settles over standard exchange platforms using existing infrastructure and permits trading 3 mo, 6 mo, 9 mo and even years out into the future, depending on the implementation. The treasury interest rate risk futures can settle to Quarterly Treasury Auctions.

An example of treasury interest rate risk futures according to one embodiment of the IRFI follows: (1) 10 year treasury interest rate risk futures are long dated listed futures or standardized forward contracts on the U.S. Treasury quarterly 10 year Refunding Auctions. (2) Unlike the cash market, treasury interest rate risk futures can trade years out into the future. (3) Quoting is in yield. The price is simply (100-yield). (4) Each basis point will equal a round fixed dollar value of $100. (5) Hedging $100,000.00 of risk per basis point would simply require 1,000 contracts. (5) The settlement yield and delivery price is determined by the corresponding Treasury Auction. (6) The notional delivery amount in millions is calculated as follows: (# of Contracts*$100)/Dollar Value of a Basis Point per million of the new WI bond.

The IRFI can net trades to a single position, thereby providing efficiencies not available to OTC swaps and MAC swaps.

Figure 6:
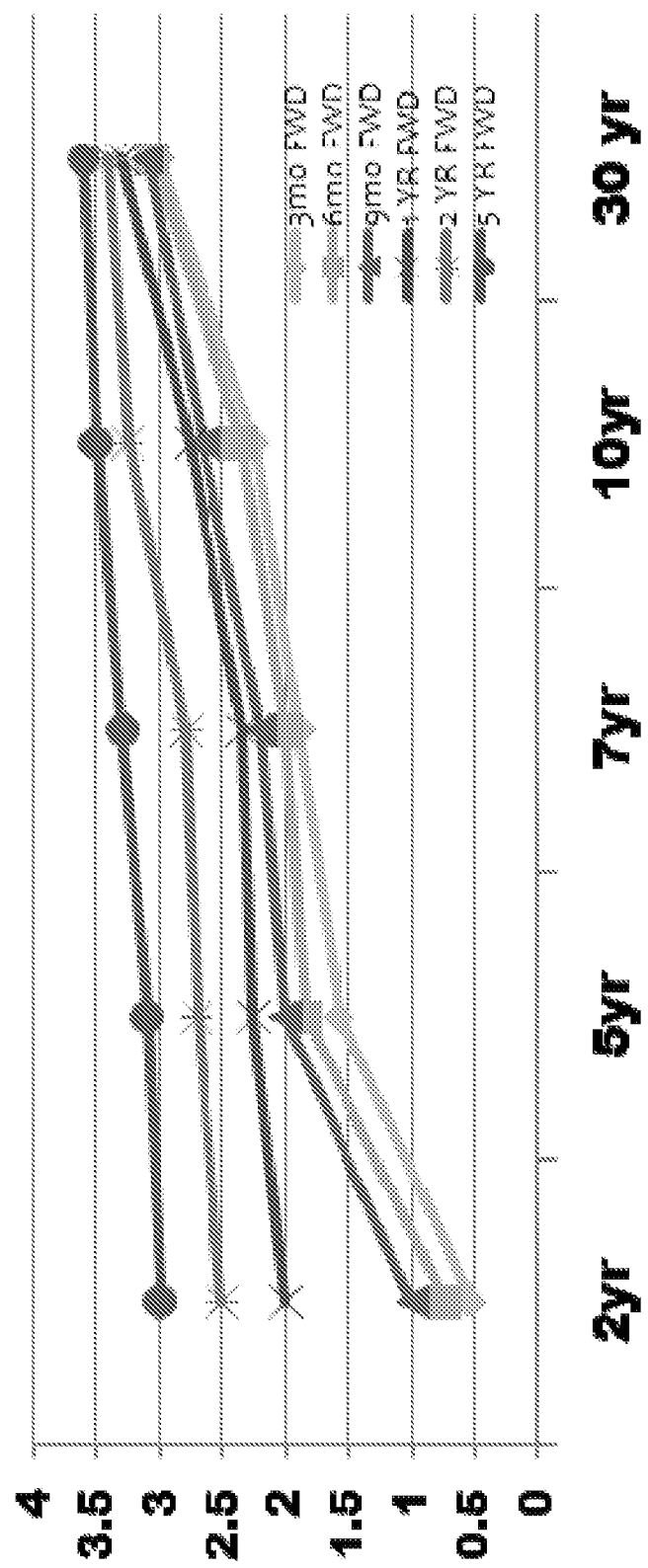
FIG. 6 illustrates multi-curve benchmark rates for some embodiments of the IRFI.

According to some embodiments of the IRFI, interest rate risk futures provide the ability to trade benchmark rates out into the future, on multiple curves, as shown in the chart in FIG. 6.

The following is an example use case for the IRFI: An investor believes 10 year rates will drift higher into the new auction supply. He or she decides to risk $100,000 per basis point that rates will move higher. The investor sells 1,000 contracts of the 10 year treasury interest rate risk futures at 3.00% at a price of 97.00. 1000 contracts*$100=$100,000 in Risk per basis point. That day the treasury interest rate risk futures settles at 3.01%, new price=96.99, for a profit of 1 basis point on a mark-to-market. On Day 2, the investor decides to cover his or her short in the underlying Bond Auction. Since rates are close to 3%, he or she can calculates the DV01 to be 833 per million. Taking his $100,000 in risk, he or she divides it by the DV01 per million of the new WI and determines he or she needs 120 million in bonds to bid. The Auction comes at 3.06%. The investor earns an additional $500,000 (5 basis points*1,000 contracts*$100) as his or her short position settles there. The investor's short futures position produces an obligation of a 120 mm sale at 3.06% on the WI, which is neatly netted versus his purchase of 120 mm at 3.06% in the Auction.

The following is an example use case for the IRFI illustrating an option trade: On Day 1, an investor believes the FED is behind the curve and decides rates will move higher, only this time he wants to limit his risk to $100,000. He buys 500 put option contracts of the 10 year treasury interest rate risk futures at 3.25% (a price of 96.75) with a 6 month expiration for a premium of 2 basis points. His cost is 500 contracts*2 basis points*$100 for a total premium of $100,000. His breakeven is 96.73. On Day 2, the market sells off sharply and the option price moves from 2 basis points to 4. The investor has a mark-to-market profit of $100,000. The investor can either hold his position into option expiration and become short 500 futures at 97.75, or he can realize the profit by closing out the transaction at 4 basis points. The investor was able to make a option transaction on a 10 year rate, 6 months forward, in an extremely elegant and efficient format. As can be seen, trading systems implementing the IRFI can benefit from the simplified calculations and reduced bandwidth required.

In order to address various issues and advance the art, the entirety of this application for IRFI (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a IRFI individual and/or enterprise user, database configuration and/or relational model, data type, data transmission and/or network framework, syntax structure, and/or the like, various embodiments of the IRFI may be implemented that allow a great deal of flexibility and customization. For example, aspects of the IRFI may be adapted for data network bandwidth management. While various embodiments and discussions of the IRFI have been directed to financial instrument and derivative construction, trading, and management, however, it is to be understood that the embodiments described herein may be readily configured and/or customized for a wide variety of other applications and/or implementations.

What is claimed is:
1. A method comprising:
  receiving, at a server, a user selection of a contract;
  receiving, at the server a user-selected number of contracts to trade associated with a basis point for the contract;
  determining a risk hedging amount based on the basis point for the contract and the user-selected number of contracts to cover a risk in an auction without iterative yield-to-price calculations;
  receiving pricing data at the server associated with the auction, the pricing data including a settlement yield and a delivery price;
  determining a delivery amount for the contract based on the received pricing data at the server without requiring a separate calculation to determine the delivery amount; and
  facilitating a transaction of the delivery amount, the transaction including trading the contract based on Dollar Value of a basis point without a fixed notional value, such that the delivery amount corresponds to the risk hedging amount.
2. The method of claim 1, wherein price movement of the contract associated with a change in yield is held constant.
3. The method of claim 1, further comprising facilitating settlement of the transaction based on the auction without requiring a separate calculation.
4. The method of claim 1, wherein the contract is an interest-based instrument traded in round units of risk such that spread trading is in fixed ratios.
5. The method of claim 1, wherein the contract is an interest-based instrument and risk of a basis point movement is fixed.
6. A non-transitory memory storing processor-readable instructions, the processor-readable instructions being executable by at least one processor from a plurality of processors, the processor-readable instructions configured to cause the at least one processor to:
  receive a user indication to trade a number of an interest rate based financial instruments (IRFI) that is traded in Dollar Value of a basis point (DV01) and without a fixed notional value;
  determine, at a second time, a risk hedging amount to at least partially cover an auction risk of a security underlying the IRFI without iterative yield-to-price calculations;

receive pricing data from an auction system, including a settlement yield and a delivery price of the security underlying the IRFI;

determine a delivery amount for the IRFI and the security underlying the IRFI based on the pricing data; and facilitate a transaction of the delivery amount.

7. The non-transitory memory of claim 6, wherein a value at risk of the IRFI is a volatility in basis points multiplied by the number of IRFIs multiplied by a risk unit.

8. The non-transitory memory of claim 6, wherein settlement of the transaction is determined by a corresponding Treasury Auction.

9. The non-transitory memory of claim 6, wherein the processor-readable instructions further comprising include a calculator component.

10. The non-transitory memory of claim 9, wherein the calculator component includes an artificial neural network.

11. The non-transitory memory of claim 10, wherein the artificial neural network is trained to calculate the risk hedging amount and/or the delivery amount.

12. The non-transitory memory of claim 10, wherein the artificial neural network is a multilayer perceptron feedforward artificial neural network.

13. The non-transitory memory of claim 10, wherein the artificial neural network includes three or more layers, with at least one input layer, a hidden layer and an output layer.

14. The non-transitory memory of claim 13, wherein the hidden layer is configured to map the values received through the input layer via one or more nonlinear functions to generate products, included but not limited to the risk hedging amount and/or the delivery amount.

15. The non-transitory memory of claim 6, wherein the security underlying the IRFI is at least one of an over the counter (OTC) derivative or traded on a when issue (WI) basis.

* * * * *